US011351595B2

(12) United States Patent
Pellenc et al.

(10) Patent No.: US 11,351,595 B2
(45) Date of Patent: Jun. 7, 2022

(54) APPARATUS FOR PLACING WIRE FASTENERS

(71) Applicant: PELLENC, Pertuis (FR)

(72) Inventors: Roger Pellenc, Pertuis (FR); Nicolas Chaudet, Pertuis (FR); Philippe Gilbert, Le Puy Sainte Reparade (FR)

(*) Notice: Subject to any disclaimer, the term of this patent is extended or adjusted under 35 U.S.C. 154(b) by 19 days.

(21) Appl. No.: 16/964,082

(22) PCT Filed: Mar. 4, 2019

(86) PCT No.: PCT/FR2019/050476
§ 371 (c)(1),
(2) Date: Jul. 22, 2020

(87) PCT Pub. No.: WO2019/180340
PCT Pub. Date: Sep. 26, 2019

(65) Prior Publication Data
US 2021/0039157 A1 Feb. 11, 2021

(30) Foreign Application Priority Data
Mar. 20, 2018 (FR) ...................................... 1870310

(51) Int. Cl.
*B21F 15/04* (2006.01)
(52) U.S. Cl.
CPC ..................... *B21F 15/04* (2013.01)
(58) Field of Classification Search
CPC .......... B21F 15/02; B21F 15/04; B25B 25/00; E04G 21/122; E04G 21/123; B65B 13/025; B65B 13/04; B65B 13/08; B65B 13/14; B65B 13/027; B65B 13/28; B65B 13/26; A01G 17/085; B65H 37/005; B65H 49/205; B65H 75/48; B65H 75/406; B65H 2402/41
See application file for complete search history.

(56) References Cited

U.S. PATENT DOCUMENTS 3,590,885 A 7/1971 Ward
5,217,049 A * 6/1993 Forsyth ................. E04G 21/122
140/57

(Continued)

FOREIGN PATENT DOCUMENTS

JP H07125719 A 5/1995
JP 2010189055 A 9/2010

OTHER PUBLICATIONS

Kelly's 5 Distribution LLC, Cable Tie Gun—How to Use, Aug. 20, 2017, Youtube, https://www.youtube.com/watch?v=R4rS_Jd9Swg (Year: 2017).*

(Continued)

*Primary Examiner* — Teresa M Ekiert
(74) *Attorney, Agent, or Firm* — Egbert, McDaniel & Swartz, PLLC

(57) ABSTRACT

A tie placement apparatus having a body with a handgrip. The tie placement apparatus has a wire inlet adapted to receive a tie wire, a tie placement head, and an electric motor cooperative with the tie placement head so as to actuate the tie placement head. A first reel-holder is adapted to receive a tie wire reserve therein. The body has an attachment socket that removably receives the first reel holder. The attachment socket and the first reel holder are affixed together by an elastic latch.

14 Claims, 4 Drawing Sheets

(56) References Cited

U.S. PATENT DOCUMENTS

| | | | | | |
|---|---|---|---|---|---|
| 5,279,336 | A | * | 1/1994 | Kusakari | E04G 21/123 140/57 |
| 5,778,946 | A | * | 7/1998 | Pellenc | A01G 17/085 140/119 |
| 5,871,036 | A | * | 2/1999 | Murayama | E04G 21/122 140/119 |
| 5,944,064 | A | * | 8/1999 | Saito | B65B 13/285 140/119 |
| 7,299,829 | B2 | * | 11/2007 | Kim | E04G 21/122 140/119 |
| 9,748,780 | B2 | * | 8/2017 | Suzuki | H01M 50/213 |
| 2005/0061389 | A1 | * | 3/2005 | Nakagawa | E04G 21/123 140/119 |

OTHER PUBLICATIONS

English Translation of International Search Report for corresponding PCT/FR2019/050476, dated Sep. 26, 2019.
Written Opinion of the International Searching Authority for corresponding PCT/FR2019/050476, dated Sep. 26, 2019.

* cited by examiner

APPARATUS FOR PLACING WIRE FASTENERS

FIELD OF THE INVENTION

The present invention relates to an apparatus for placing wire ties.

Such an apparatus, still called a "tying gun," is used for the attachment of small branches or shoots of trees, shrubs, or bushes, or even for the attachment of vine canes onto a thin support and in particular onto training wires.

The attachment is done by means of a tie wire twisted by the tying gun.

The main applications of the invention are in the fields of arboriculture, in particular fruit tree culture, and viticulture.

DESCRIPTION OF THE RELATED ART

An illustration of the state-of-the-art is given by the patent EP 0,763,323. The patent EP 0,763,323 relates to a tying gun provided with a single actuation electric motor supplied with direct-current. The motor provides the actuation of a tie placement head of the gun for the functions of preparation of a tie from tie wire and for an operation consisting of twisting the tie wire after placement thereof around the elements to be tied.

The tie wire is made up of at least one soft or stainless-steel wire, straight or folded, and provided with a sleeve, preferably a sleeve ribbon of paper or plastic. It is delivered by a remote tie-wire reel, carried on the belt of the user.

The documents CN106818391 or CN206564982 show the tie gun provided with an integrated tie-wire reel.

The state-of-the-art is also illustrated by the following documents which relate to apparatuses for placing tie wires provided with a local reel-holder or remote reel-holder:

U.S. Pat. No. 3,590,885
JP H07 125,719
JP2010 189,055

BRIEF DESCRIPTION OF THE INVENTION

The invention follows from the identification of some number of difficulties encountered with known tie guns.

The following difficulties can in particular be overcome:

The use of guns with remote reels could cause difficulties for feeding the tie wire and an unexpected tangling of the tie wire with plants or obstacles located in the area of the user. For example, making ties high up requires considerable stretching of the arm and thus increases the length of the tie wire fed between the reel and the tyer. Making a tie next in a position close to the reel leads to risks of damage for the tie wire previously fed from the reel.

The use of low-strength tie wires or longitudinally extendable tie wires could lead to unwanted stretching of the tie wire before reaching the tie placement head in particular because of stresses experienced by the tie wire before entry into the tie placement apparatus.

The use of tie-wire reserves integrated in the tie gun and in particular tie-wire reels integrated in the tie gun increases the weight of the gun and makes it unsuited for sustained use. In this respect it can be noted that the number of ties usually placed in a vineyard can vary with the mode of training the vine and the variety from 9000 to 80,000 ties per hectare.

Furthermore, the use of tie-wire reserves integrated in the tie gun considerably limits the length of the reserve wire available because of the weight and dimensions of the wire.

In order to overcome these difficulties, the invention proposes a tie placement apparatus with an apparatus body provided with a handgrip and comprising:

a wire inlet for receiving a tie wire;
a tie placement head;
at least one electric motor for actuation of the tie placement head; and
at least one first reel-holder for receiving a tie-wire reserve.

Conforming to the invention, the apparatus body comprises an attachment socket which can receive the first reel-holder, for removable attachment of the first reel-holder onto the apparatus body, where the first attachment socket and the first reel-holder comprise an elastic latch.

The removable attachment of the first reel-holder allows quickly switching from an integrated reel apparatus configuration to a remote reel apparatus configuration and vice versa, by freeing the apparatus not only of the weight of the reel in the remote reel configuration but also by freeing it from the weight of the first reel-holder.

With this characteristic, the weight of the hand-carried apparatus can be reduced in a remote reel configuration. It thus make it more appropriate for an intensive use over an extended time. It also makes it possible to make ties on various trees or shrubs over the course of the day requiring ties at varying heights. The user can in that way over a day of work use the first reel-holder on the apparatus allowing them to position ties without having constraints from a tie wire which would be attached to them, and then alternate with the remote positioning of the reel allowing them to limit the fatigue associated with handling of the apparatus.

Integrated reel configuration designates a configuration in which the first reel-holder is mounted on the apparatus body. The first reel-holder can in this case be provided with a tie-wire reel feeding the tie placement apparatus.

The remote reel configuration is understood as the configuration in which the first reel-holder is removed from the tie placement apparatus. In this case, a tie-wire reserve can be made up by a reel carried, for example, on the belt or on the back in a carrying harness. The carrier of the remote reel can comprise the first reel-holder detached from the apparatus and positioned removably on the belt or on the harness.

The double configuration also makes it possible to use the apparatus with two different tie-wire types. The first tie-wire type, for example non-stretchable wire, can be used in the remote reel configuration, and a second tie-wire type, for example the stretchable tie wire, can be used in the integrated reel configuration.

It is considered that the attachment socket for the first reel-holder is a socket which could receive a reel-holder compatible with the socket for removable attachment thereof.

Preferably, the attachment socket for the first reel-holder can be disposed near the wire inlet.

Advantageously, the attachment socket and the first reel-holder can have respectively complementary nesting reliefs for attachment of the first reel-holder on the attachment socket by form-fitting.

With such an attachment method, the reel-holder can be placed and removed quickly and without tools. This characteristic is particularly advantageous for a user wearing gloves for protection which reduce their tactile sensitivity.

The nesting reliefs of the socket can in particular comprise tracks on either side of the wire inlet. With this disposition, the reel-holder can be attached closer to the wire inlet.

The arrangement of the attachment socket for the first reel-holder near the wire inlet has several advantages. In particular it serves to reduce the distance traveled by the tie wire outside of the reel and tie placement apparatus, and to thus reduce a risk of unwanted snagging of the tie wire.

Another advantage is to provide a balance of the masses of the apparatus when the tie-wire inlet and the tie placement head are arranged at opposite ends of to the apparatus body, on either side of the handgrip held.

According to another attractive implementation possibility for the tie placement apparatus, it may comprise a battery, integrated in the apparatus body, for supplying the electric motor with energy.

In this case, the apparatus may preferably comprise an electric jack for the connection of a battery charger.

The battery can be housed, for example, in a handgrip of the tie placement apparatus.

Incorporating a battery in the apparatus body serves to avoid an electric power cord to a remote battery and thus removes the risk of tangling of the tie wire with the electric power cord, during a use in a remote reel configuration. It also improves handling of the apparatus because this additional connection of the apparatus to the user is not there.

Charging and discharging of the battery can be controlled by the electronic circuit also commanding the motors.

The integration of the battery into the apparatus body is made possible by a reduction of the weight and an increase of the capacity of the batteries, and notably lithium batteries, more specifically lithium ion or lithium polymer batteries. The extra weight of the apparatus, resulting from the integrated battery, is also compensated, at least in part, by the possibility of removing the reel-holder.

It is appropriate to underline that the possibility of integrating a battery into the body of the apparatus does not exclude use of the apparatus with a remote battery and in particular with a battery worn on the belt or on a carrying harness.

The electric jack serves to connect the tie placement apparatus to an electric charger for the battery, or possibly an electric power cable connecting the apparatus to a remote battery. The jack can preferably be formed by a female socket.

Advantageously, the first reel-holder can form a protective cap for the electric jack when the first reel-holder is received on the apparatus. The electric jack is in that case protected by the placement of the first reel-holder on the body of the apparatus. The jack is in particular protected against the unwanted introduction of dirt or foreign matter. It is also protected against an inadvertent insertion of the tie wire in the jack.

The electric jack may in fact be arranged near the wire inlet.

In this case, the first reel-holder forms a cap for the jack but also comprises a passage for the tie wire towards the tie-wire inlet.

As indicated above, the attachment socket of the first reel-holder comprises a latch for locking the position of the first reel-holder onto the apparatus body. The elastic latch serves to provide the hold of the reel-holder on the body of the attachment placement apparatus. Further, the use of an elastic latch, meaning a click-lock latch, also allows easier handling for a gloved user.

According to a specific possibility for execution of an elastic latch, it may comprise an elastic blade secured to the first reel-holder, and a notch in the attachment socket with a shape complementary to the elastic blade with the notch receiving the elastic blade in a locked position. The metal blade is for example a stainless-steel blade.

Beyond the reel-holder, the tie placement apparatus may comprise a protective cover for the electric jack, separate from the first reel-holder, and compatible with the attachment socket of the first reel-holder, where the protective cover may be placed on the attachment socket when the reel-holder is removed from the apparatus body.

The cover may have an elastic blade conjugate to the notch in the attachment socket, mentioned above, and form a latch with the notch.

In this case, it also involves an elastic latch comparable to the one from the first reel-holder.

In a manner already brought up previously, the apparatus may further comprise, a second reel-holder, distinct from the first reel-holder and away from the apparatus body.

It is thought that the second reel-holder is away from the apparatus body when it is not connected to the apparatus body other than by the tie wire with which it could be provided.

The second reel-holder may receive one or more reels of tie wire for use of the apparatus in a remote reel configuration.

The apparatus can in this case comprise at least one among a carrying belt and a carrying harness on the back, away from the apparatus body and provided with the second reel-holder. The belt and/or the harness may also be used for carrying an electric supply battery or an auxiliary battery.

Alternatively, the belt and/or harness may comprise an attachment socket with a shape similar to that of the apparatus body, and the first reel-holder can be fixed onto the belt and/or the harness and thereby constitute the second reel-holder.

In one use of the tie placement apparatus with a remote reel, the apparatus is held by the handgrip, by one hand of the user. The user may in that case carry the second reel-holder on the belt, for example.

The attachment placement apparatus may comprise at least one tie-wire reel received on the first reel-holder. It may also comprise, as needed, one or more wheels equipping the second remote reel-holder.

Other characteristics and advantages of the invention emerge from the description which follows and references the figures from the drawings. This description is given for illustration and is nonlimiting.

The figures are made at an arbitrary scale.

DETAILED DESCRIPTION OF THE EMBODIMENTS OF THE INVENTION

Figure 1:
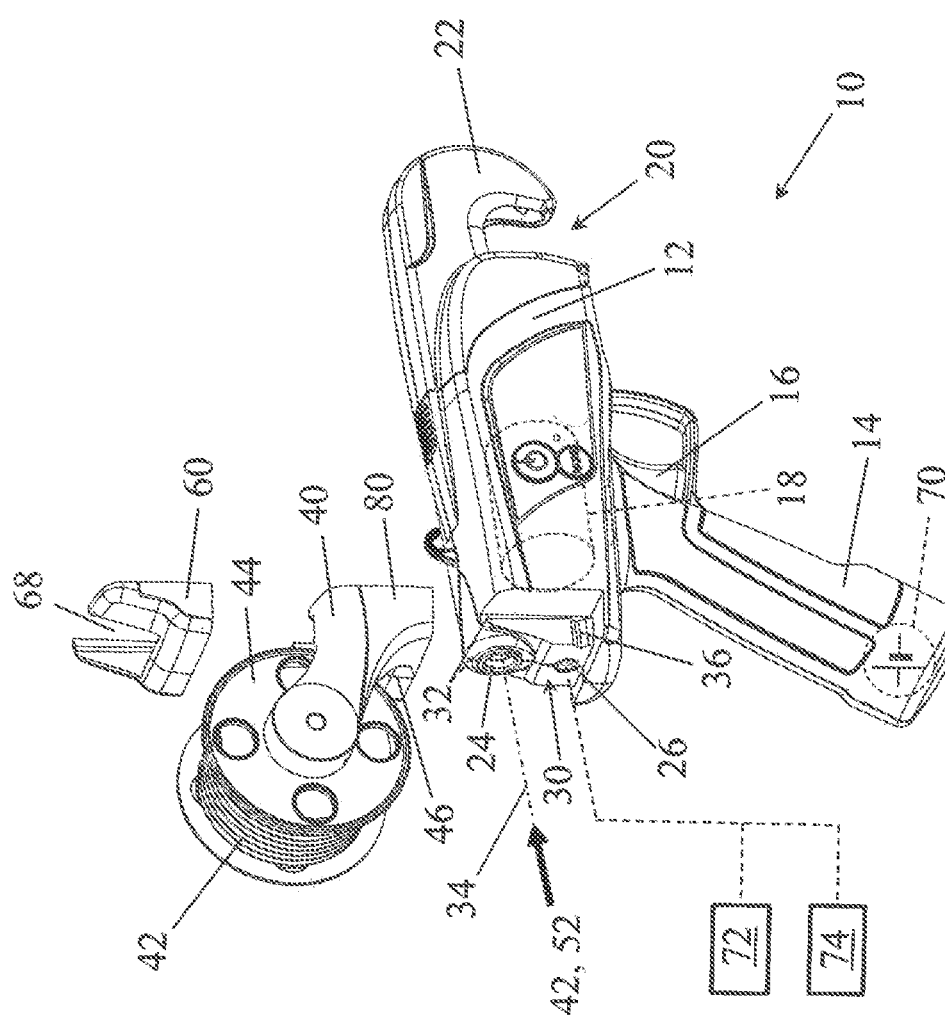
FIG. 1 is a perspective of a tie placement apparatus conforming to the invention.

FIG. 1 shows a tie placement apparatus 10 conforming to the invention. It involves the tie gun with an apparatus body 12 provided with a handgrip 14 with an activating trigger 16.

The trigger serves to start the placement of a tie.

A tie placement head 20 is located at the front of the apparatus. It is provided with a characteristic beak 22 for engaging with elements to be tied. Typically, the beak 22 can be engaged on a shoot or cane and training wire for fixing the shoot or cane onto the training wire by means of a twist tie.

The tie placement head 20 essentially comprises a pivoting, wire-guide hook housed in the beak 22. It also comprises a feed mechanism for the tie wire for advancing the tie wire in the hook around the elements to be tied, a blade for cutting tie-wire segments, and a twister for twisting the free ends of the cut tie-wire segments and forming a tie around the elements to be tied. The assembly of these components is moved by an electric motor 18 shown schematically in broken line.

The detailed operation of the tie placement head is not described here. As needed, the description from the patent EP 0,763,323 may be consulted; the present invention is an improvement on that patent.

A tie-wire inlet 24 and an electric jack 26 are located at the rear of the apparatus, meaning the other end from the tie placement head 20, relative to the handgrip 14.

Around the tie-wire inlet 24 and the electric jack 26, the apparatus body 12 has a socket 30 for the removable attachment of the first reel-holder 40.

On either side of the wire inlet 24, the socket 30 has a nesting relief in the form of grooves, forming tracks 32 for engagement of the first reel-holder 40 by form-fitting. The tracks extend substantially perpendicularly to the axis 34 of engagement of the tie wire in the tie-wire inlet 24.

The attachment socket 30 also has a notch 36 for an elastic latch described previously.

The tie-wire inlet 24 can receive a tie wire 42 from a wire reel 44 supported by the first reel-holder 40 when the first reel-holder is in place on the socket 30.

Figure 2:
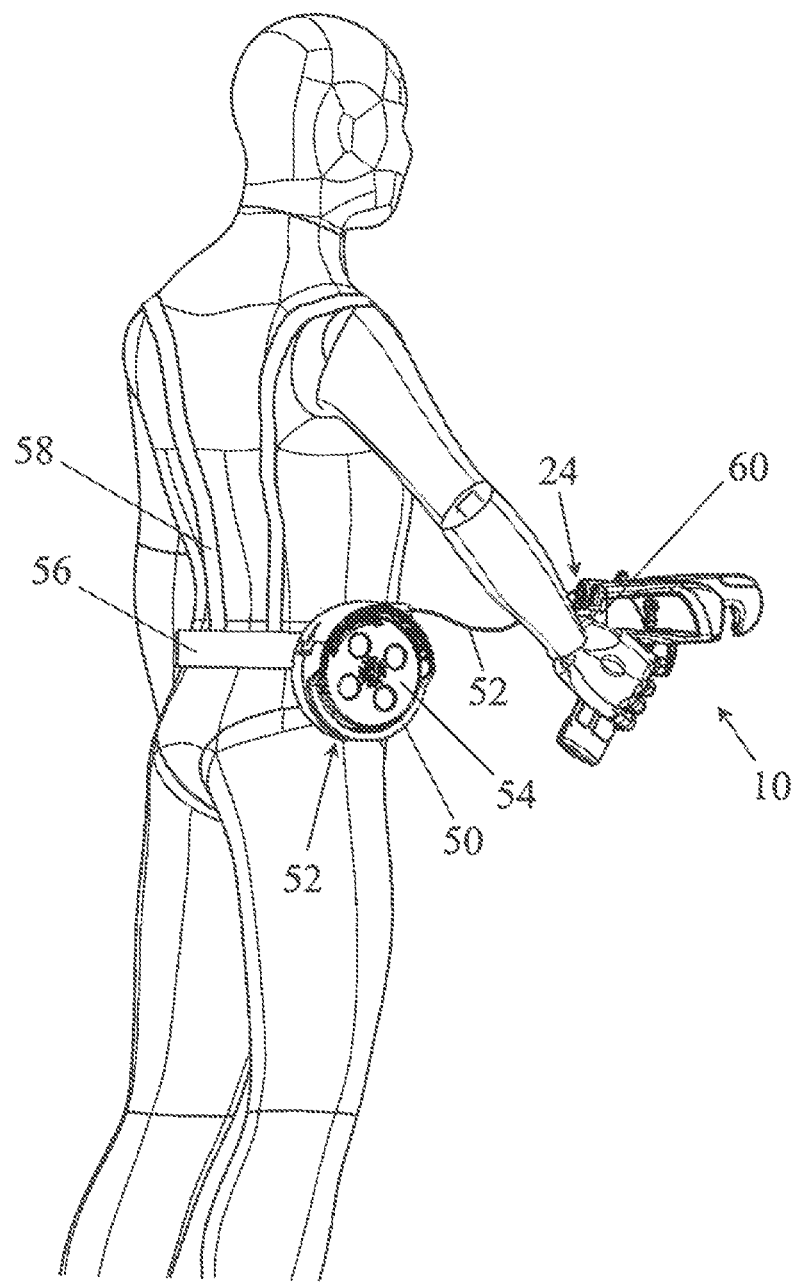
FIG. 2 is a schematic representation of a tie placement apparatus conforming to the invention and held in the hand and shows use of the apparatus with a remote reel.

Alternatively, the tie-wire inlet can also receive, a tie wire 52 from a wire reel 54 supported by a remote second reel-holder 50, as shown in FIG. 2. This tie wire 52 then replaces the tie wire 42 from the reel 44 located on the first reel-holder 40. In the example from FIG. 2, the second remote reel-holder 50 is mounted on the belt 56 of a harness 58 worn by a user.

The first and second reel-holders allow a use of the tie placement apparatus either in an integrated reel configuration or in a remote reel configuration.

Returning to FIG. 1, the first reel-holder 40, when it is in place on the socket 30, constitutes a protective cap for the electric jack 26. The part of the first reel-holder forming the protective cap is indicated with the reference 46.

When the first, removable reel-holder 40 is taken off the socket 30 of the apparatus body 12, it can be replaced there by a cover 60. The cover 60 also forms protection for the electric jack 26.

The protective cover when it is in place on the socket 30 however has a notch 68 leaving clear a passage to the inlet for the tie wire 24.

The principal power source for the electric motor 18 of the tie placement apparatus 10 is made up of an electric battery 70 integrated in the handgrip 14. The electric battery is shown schematically.

The battery can be charged by means of a charger 72, outside the placement apparatus 10, and connected to the jack 26 by an electric cable. During charging the battery, the first reel-holder 40 and the cover 60 are removed from the socket 30.

Another possibility for supplying the motor consists of using the remote battery 74 outside the placement apparatus and carried, for example, on the harness 58. The remote battery can also be connected to the jack 26. Use of a remote battery is reserved for use of the apparatus in the remote reel configuration, meaning without the first reel-holder 40. The cover 60 is also removed for connecting a remote battery 74.

Figure 3:
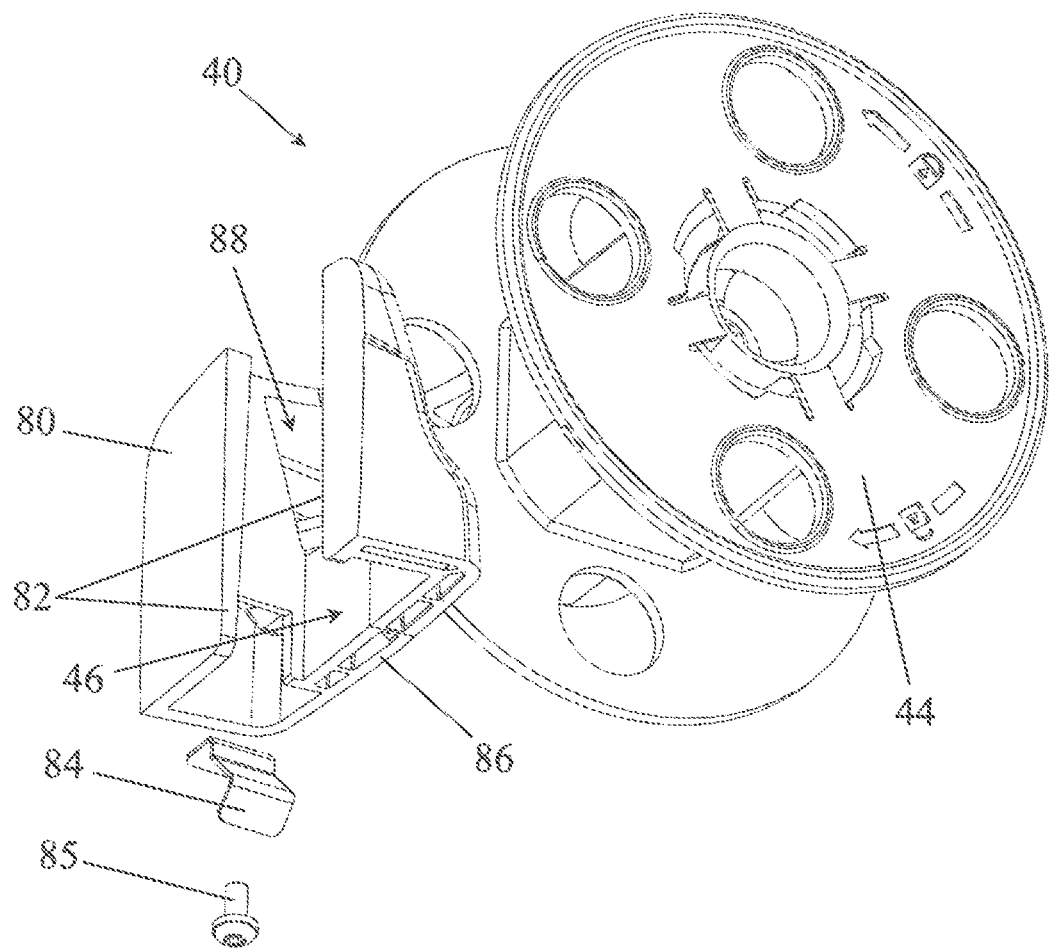
FIG. 3 is a perspective, at larger scale, partially exploded, of a first reel-holder for the placement apparatus from FIG. 1.

FIG. 3 shows the first reel-holder 40 and the reel 44 mounted on the first reel-holder in more detail. The reel 44 is shown without tie wire.

It can be seen that the first reel-holder 40 has an attachment base 80 with a complementary shape to the socket 30 of the apparatus body 12. The attachment base 80 comprises in particular two projecting tracks 82 which could be engaged on the grooves forming the tracks 32 of the socket. In other words, the tracks 82 of the attachment base 80 can slide in the tracks 32 of the attachment socket 30 in a form-fitting configuration, so as to engage the first reel-holder 40 on the socket 30.

The base 80 also has a partition 86 forming the cap 46 for protection and covering of the electric jack 26.

An opening 88 and the partition 86 allows a tie wire to pass from the reel 44 to the tie-wire inlet 24 when the first reel-holder 40 is in place on the socket 30.

The presence in the base 80 of a small folded metal blade 84 fixed to the base by a screw 85 can be seen in FIG. 3. These latter two references are shown disassembled.

When it is fixed in the base 80, the metal blade 84 together with the notch 36 in the socket 30, visible in FIG. 1, forms an elastic, click-lock latch. The elbowed part of the metal blade comes to engage in the notch during placement of the first reel-holder 40 on the socket 30 and serves to retain the first reel-holder on the base.

The latch is released by exerting a sufficient pulling force on the first reel-holder 40 in the axis of the tracks 82 to fold the elastic metal blade and disengage it from the notch 36.

Figure 4:
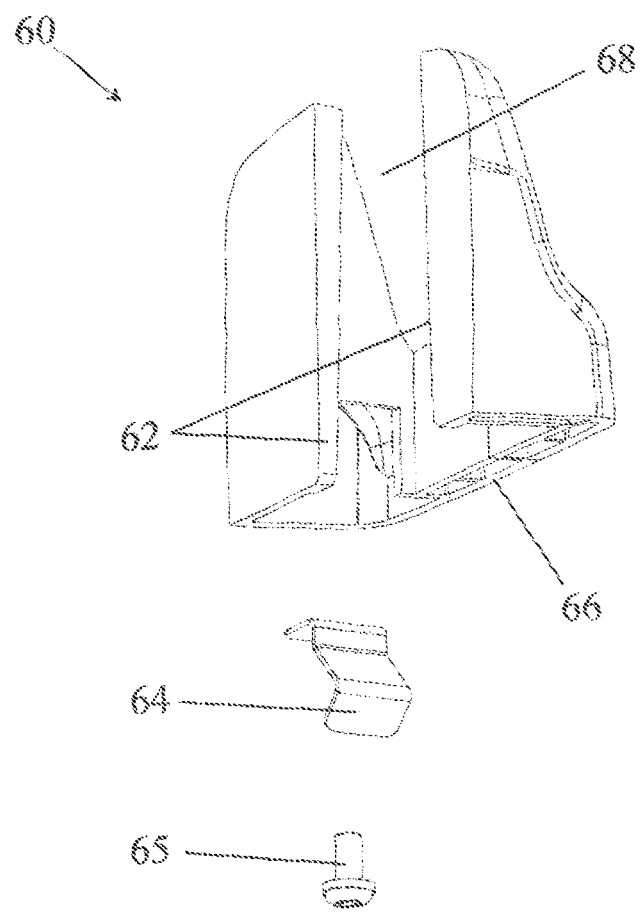
FIG. 4 is a perspective, at larger scale, partially exploded, of a cover for the placement apparatus from FIG. 1.

FIG. 4 shows, at larger scale, the cover 60 which could be installed on the socket 30 of the apparatus body 12 instead and in place of the first reel-holder 40. The general configuration of the cover is close to that of the base 80 described with reference to FIG. 3.

The cover has a partition 66 forming a protective cap for the electric jack 26 and a notch 68 to allow passage of the tie wire.

The cover 66 also has tracks 62, comparable to the tracks 82 of the base 80 from FIG. 2. The tracks 62 of the cover 60 are engageable with the tracks 32 of the socket 30 of the apparatus body 12 by form-fitting.

The cover 60 also has a metal blade 64 attached by a screw 65. Just like the metal blade 84 for the base 80, the metal blade 64 serves to form an elastic latch with the notch 36 of the socket 30 of the apparatus body 12.

The invention claimed is:

1. A kit comprising:
    a tie placement apparatus having a body with a handgrip, said tie placement apparatus comprising:
        a wire inlet adapted to receive a tie wire;
        a tie placement head; and
        at least one electric motor cooperative with said tie placement head so as to actuate said tie placement head;
    at least one first reel-holder adapted to receive a tie wire reserve, wherein the body has an attachment socket that removably receives said at least one first reel-holder, the attachment socket and said at least one first reel-holder being fixed together by an elastic latch, wherein the attachment socket and said at least one first reel-holder have respective complementary nesting reliefs for form-fitting attachment of said at least one first reel-holder on the attachment socket, wherein the complementary nesting reliefs of the attachment socket have tracks formed by grooves on either side of said wire inlet.

2. The kit of claim 1, further comprising:
a first elastic blade secured to said at least one first reel-holder, said first elastic blade forming the elastic latch, the attachment socket having a notch having a shape complementary to said first elastic blade so as to receive said first elastic blade in a latched position.

3. The kit of claim 2, further comprising:
a battery positioned in the body and connected to said at least one electric motor so as to supply power to said at least one electric motor.

4. The kit of claim 3, further comprising:
an electric jack connected to a battery charger for said battery.

5. The kit of claim 4, wherein said at least one first reel-holder forms a protective cap for said electric jack when said at least one first reel-holder is received on the body.

6. The kit of claim 4, wherein said electric jack and said wire inlet are positioned at a rear of the body.

7. The kit of claim 4, further comprising:
a protective cover for said electric jack, said protective cover being separate from said at least one first reel-holder, said protective cover being compatible with the attachment socket of said at least one first reel-holder, said protective cover being positioned on the attachment socket when said at least one first reel-holder is removed from the body.

8. The kit of claim 7, wherein protective cover has a second elastic blade engageable with the notch in the attachment socket so as to form a latch with the notch.

9. The kit of claim 1, further comprising:
at least one second reel-holder distinct from said at least one first reel-holder.

10. The kit of claim 9, further comprising:
at least one of a belt and harness adapted to be placed on a back of a user, said at least one of a belt and a harness receiving said at least one second reel-holder away from the body.

11. The kit of claim 1, wherein said at least one first reel-holder has a tie-wire reel received thereon.

12. The kit of claim 1, wherein the tracks of the complementary nesting reliefs of the attachment socket extend substantially perpendicularly to an axis of engagement of the tie wire in said wire inlet.

13. The kit of claim 1, wherein the tracks of the complementary nesting reliefs of the attachment socket extend along a sliding direction, the wire inlet being positioned within an extension of the tracks along the sliding direction such that the wire inlet is flanked by the tracks.

14. The kit of claim 1, wherein the tracks of the complementary nesting reliefs of the attachment socket belong to a common plane, wherein extensions of the tracks define a surface within the common plane, the wire inlet being positioned such that the tie wire crosses the surface such that the tie wire is flanked by the tracks.

* * * * *